United States Patent [19]
Berdelle-Hilge

[11] 3,769,175
[45] Oct. 30, 1973

[54] PROCESS AND APPARATUS FOR THE CONTINUOUS TREATMENT OF LIQUIDS WITH ENZYME CARRIERS

[75] Inventor: Philipp Berdelle-Hilge, Mainz/Rhein, Germany

[73] Assignee: Intermag GmbH., Aarau, Switzerland

[22] Filed: July 15, 1971

[21] Appl. No.: 163,168

Related U.S. Application Data

[62] Division of Ser. No. 758,019, Sept. 6, 1968, abandoned.

[52] U.S. Cl. .............................................. 195/139
[51] Int. Cl. ............................................. C12b 1/00
[58] Field of Search .................. 195/127, 139, 116, 195/137, 141, 132, 133, 115, 1; 210/224, 226; 99/275, 276, 277.1; 100/195

[56] References Cited
UNITED STATES PATENTS

| | | | |
|---|---|---|---|
| 3,580,840 | 5/1971 | Uridil | 210/11 |
| 3,425,839 | 2/1969 | Pinnegar | 99/31 |
| 2,811,336 | 10/1957 | Bready | 257/234 |

Primary Examiner—Lionel M. Shapiro
Assistant Examiner—R. B. Penland
Attorney—Curtis, Morris & Safford

[57] ABSTRACT

A process and apparatus has been provided for accelerated fermentation of fermentable liquids, such as beer wort. Accordingly, an enzyme carrier dispersion such as yeast is deposited either before or concurrently with the fermented liquid in a layer on a porous body which has pores sized to pass the liquid but not the enzyme carrier. As a result of the capability to support considerable amount of the enzyme carrier on the porous support, fast fermentation rates are achieved. Moreover, the enzyme carrier may be deposited on an inert material and then deposited on the porous support which allows easy metering of the necessary amount of enzyme for facile control of the fermentation reaction. An apparatus has also been provided which comprises at least one chamber having an inlet conduit for introducing an enzyme carrier dispersion and the liquid, the chamber being provided with communicating conduits with a next, adjacent chamber. Further, closing means are provided for the apparatus communicating with each chamber for alternatively closing said inlet conduits, as well as a porous member within the chamber upon which the enzyme carrier is deposited. The porous member has pores of a diameter less than the diameter of particle sizes in said enzyme dispersion. Still further, the apparatus is provided with a conduit for collecting the fermented liquid communicating with the last chamber, the porous body having communicating conduits with each chamber wherein the porous body forms the outlet opening of the preceding chamber and the inlet opening for the adjacent chamber.

6 Claims, 1 Drawing Figure

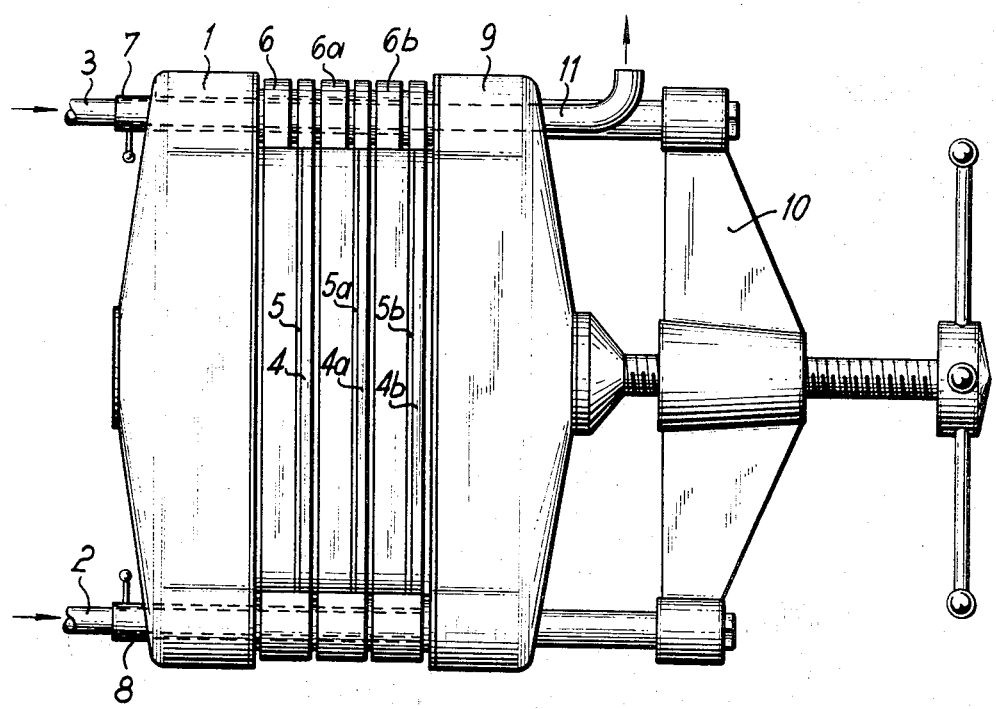

PROCESS AND APPARATUS FOR THE CONTINUOUS TREATMENT OF LIQUIDS WITH ENZYME CARRIERS

This is a divisional application of Ser. No. 758,019 filed Sept. 6, 1968, and now abandoned.

This invention relates to a process and apparatus for the continuous treatment of liquids having enzyme carriers in admixture therewith; more particularly, this invention pertains to a new process for the continuous treatment of liquids with enzyme carriers in high concentrations, preferably for the fermentation of alcoholic beverages such as wine, beer, champagne or for the fermentative ripening of cream for the production of cheese by means of rennet as well as to an apparatus for the carrying out of this method.

A continuous fermentation of wort in the presence of yeast in the manufacture of beer is known from British Pat. No. 872,395 and from German Provisional Pat. Nos. 1,205,041 and 1,207,324. The first two patents relate to two-stage fermentation processes in which a mixture of wort, yeast and air is subjected to fermentation in a first tank while intensively and continuously agitated, and the mixture is fermented further in a second tank with weaker agitation, whereupon the yeast is separated and the fermented wort is discharged after cooling and separation of the yeast. The last-mentioned German Provisional Patent describes a continuous fermenting of wort in the presence of yeast of high concentration in a slim fermentation tower. This tower is provided at its lower end with inlets for wort and air and is connected at its upper end to a yeast settling chamber, perforated distribution elements, which extend over the cross-section of the fermentation tower, being arranged over the entire length of the latter.

With such an apparatus, it is said to be possible to operate with yeast concentrations of about 20 to 60 percent and, hence, correspondingly accelerate the fermentation process.

However, these methods have the disadvantage that yeast, which acts as emzyme carrier, is suspended in the wort so that the enzyme is present in the wort to be fermented only in a relatively low concentration of about 2 to 5 percent. As it is known, however, that the rate of fermentation is a function of the yeast, i.e., enzyme concentration, these processes do not offer any advantage in this respect over batch methods.

In accordance with German Provisional Pat. No. 1,207,324, the process apparently is carried out with very high yeast concentrations of between 20 and 60 percent while attempting to maintain the yeast in the fermentation tower in a suspended condition by supporting it directly by means of supporting elements and by distributing the flow of the fermentation gases over the cross-section of the tower. Even in this method, the enzyme concentration is high only at the start of the process while as the process is continuously carried out, the yeast very rapidly is carried along upwards into the settling chamber and is thereby diluted.

Another disadvantage of these processes is that the fermented fluid, i.e., beer, is insufficiently separated from the yeast so that an additional filtration step is required.

It is the object of this invention to provide a new process for the continuous treatment of liquids having in admixture therewith enzyme carriers, e.g., for the continuous treatment of wort with yeast, in which the fermentation times are very substantially reduced by increasing as much as possible the enzyme concentration in the fermentation chamber or zone. Another object of the novel process is to provide an apparatus which takes up as little space as possible, which can easily be handled, and from which, after the comsumption of the enzyme carrier, the latter can be removed completely without any complex, tedious processing. Finally, in accordance with the novel process, it is also possible to operate at higher temperatures, i.e., above the previously know optimum conditions for the enzyme carrier in question and with increase in pressure, thus, further reducing the time of treatment. Finally, another object of the present invention is to provide an especially designed apparatus for the carrying out of this method.

In accordance with the invention, the method for the continuous treatment of a liquid with an enzyme carrier of high concentration consists in conducting the liquid through a deposit of an enzyme carrier which is on at least one porous body and then conducting the liquid through said porous body, the pores of which are so dimensioned or sized that the enzyme carrier is retained substantially completely on the porous body but permits passage of the liquid to be treated.

When the expression "enzyme carrier" is used herein, it is to be understood thereby preferably any enzyme-producing microorganism such as yeast, as well as synthetic enzyme carriers such as for instance adsorbent carrier materials on which the enzyme has be adsorbed by immersion of the carrier materials in the enzyme solution.

For the sake of simplicity, the method will be explained below on basis of the fermentation of wort in presence of yeast to form beer. However, it is expressly pointed out that the method is also suitable for any other treatment of liquids with enzymes such as: additionally, the fermentation of other alcoholic beverages such as wine or champagne; or the acid ripening of cream for the production of cheese by means of rennet.

In the process of the present invention, it is preferable to proceed by pumping an enzyme carrier, e.g., yeast, in an aqueous suspension through an inlet opening of a fermentation chamber, the outlet opening of which consists of a porous body, such as a frit-like porous plate. As the pores of the porous body are so small for Example 3 m$\mu$ that the enzyme carrier is retained on it in the fermentation chamber while the carrier-suspending liquid flows through it, the enzyme carrier collects as a deposit on the porous body. Thereupon, the liquid to be treated, in this case wort for the obtaining of beer, is conducted continuously through the fermentation chamber until the enzyme carrier in the fermentation chamber is used up. Thereupon, the flow of the treated liquid is interrupted for a short time and the spent enzyme carrier is removed from the fermentation chamber, for example by back-washing. Thereafter, suspended enzyme carrier is again forced into the fermentation chamber and the liquid to be treated such as wort is again continuously passed through the same. A continuous separation of spent enzyme carrier is, however, also possible in a rotary filter apparatus.

It is evident that the temporary interruption instead of the back-washing step of the novel, continuous process, in order to remove the spent enzyme carrier, lasts only for a short time and, therefore, scarcely detracts from the continuous operation which is carried out in actual practice.

Instead of introducing the enzyme carrier into the fermentation chamber before passage of the liquid which is to be treated, the enzyme carrier can also be added to the liquid itself in the quantity necessary for the depositing on the porous body, in which case it also deposits on the porous body at the outlet end of the fermentation chamber.

It is particularly advisable in the process of the invention to pass the liquid to be treated through two or more fermentation chambers connected in series. The speed of fermentation is thereby greatly increased. Moreover, the destruction of the enzyme, which occurs constantly during the fermentation resulting in the reduction of the enzyme concentration in the fermentation chamber, can be overlooked during a large part of the treatment period. Operation with a plurality of porous bodies connected in series with each other, and having enzyme carriers deposited on them, or preferably with a plurality of fermentation chambers connected in series, has the further advantage that it is possible to operate with different enzyme carriers, such as different types of yeast, which lead to a different rate of fermentation.

In the present process, the liquid is preferably forced under pressure through the treatment chambers; for Example at pressure from about 0.5 to 5 atm. Furthermore, it is advantageous to operate at elevated temperatures because in this manner the speed of fermentation can further be increased.

In the case of previously known fermentation processes, it was believed that the temperature of the liquid to be treated, such as wort for the production of beer, cannot be increased beyond the optimum temperature known for the enzyme carrier used without the enzyme carrier being destroyed to a considerably extent and the rate of fermentation, thus, reduced. In the present method in which the enzyme concentration in the treatment zone is very high, it was found that a destruction of a part of the enzyme carrier caused by increasing the temperature above the previously believed optimum for the enzyme carrier in question for Example 50 instead 30° Celsius does not bring about any destruction of the enzyme (which has a higher optimum temperature than the enzyme carrier) nor bring about any detrimental consequences to the process; and the advantages of the accelerating of the fermentation effected by the increase in temperature far outweigh the disadvantages of the destruction of a part of the enzyme carrier.

Accordingly, it is particularly advantageous in the novel process to increase the temperature of the treated liquid, for instance by heating elements arranged in the fermentation chambers, to a temperature which is above the previously known optimum temperature for the enzyme carrier in question. Furthermore, when using a plurality of treating chambers, temperatures can be used which vary from chamber to chamber.

Finally, in many cases it is also advisable to treat the liquid, such as wort for the obtaining of beer, by blowing oxygen or nitrogen into the fermentation chambers whereby the speed of fermentation can further be increased.

The advantages of the present method over the previous methods reside primarily in the fact that the times of residence in the treatment zone can be very greatly reduced. This is possible as a result of the high enzyme concentration in the enzyme carrier deposit in the treatment chamber since the chemical reactions such as the fermentation or acid ripening of cream take place very much faster thereby.

For this reason, apparatuses which are very much smaller are required when compared to the prior art apparatuses for the obtaining of equal quantities of treated liquid. Moreover, operating time and labor are also saved. By the rapid passage of the liquid through the treatment zone, increase in the process pressure, and working at temperatures beyond the previously known optimum, a further reduction of the treatment time or residence time is obtained, thus, counteracting the disadvantages resulting from an increased consumption of enzyme carrier and thereby being able to neglect the same. Another advantage of the novel method is that with the small size of an apparatus required the replacement of the enzyme carrier after a certain period of time (which is always necessary even in known methods) can be carried out easily and fast.

In accordance with the invention another preferred embodiment of the process consists in using an enzyme carrier which is adsorbed on a surface-active, inert carrier material and, thus, is of a fixed quantity. This facilitates the carrying out of the fermentation since the enzyme carrier, such as yeast, can be accurately dosed, i.e., measured.

Such an enzyme carrier which can be dosed in a given quantity is obtained by mixing the enzyme-supplying micro-organisms, such as yeast, in aqueous suspension with a surface-active, inert carrier material and after adsorption on the carrier material subjecting same to a careful drying.

Surprisingly, it has, thus, been found that a definition by weight of the number of bacteria in the microorganisms is possible when these are adsorbed on surface-active material such as silica, silica-gel, activated carbon, asbestos, kieselguhr, or perlite. These surface-active materials can be so developed with respect to the size of their surface or so selected by mesh sizes that a given quantity of the said materials adsorbs a given determinable number of microorganisms. The determination of this value can be effected quantitatively by empirical methods in the laboratory and provides reproducible values.

For example, suitable materials for this purpose are pyrogenic silicas (highly dispersed, very pure silicas), having a surface of $175 \pm 25$ m2/g (by the BET method) of a particle size of between 10 and 40 $\mu$; or pyrogenic silicas having a surface of 300 m2/g with a size of the primary particles of 5 to 20 $\mu$, $380 \pm 40$ m2/g with a size of the primary particles of 3 to 15 $\mu$, or $460 \pm 50$ m2/g; or else oxide mixtures having a surface (determined by the BET method) of $200 \pm 25$ m2/g and size of the primary particles between 10 and 40 or 20 to 50 $\mu$. Similarly, for purposes of the novel process suitable materials are pyrogenically obtained, mixed oxides having an $SiO_2$ content of more than 98.3 percent a size of the primary particles of 20 to 40 or 10 to 30 $\mu$ and a surface as determined by the BET method of $60 \pm 15$, $80 \pm 15$, or $170 \pm 30$ m2/g.

In the case of pure silicas, BET surfaces of 120 m2/g (diameter of primary particles 28 $\mu$) have proven suitable and BET surfaces of 240 m2/g (primary particle diameter of 16 $\mu$) have proven advantageous. Similar suitability is also demonstrated in the case of calcium silicates ($SiO_2 = 47$ to 49.9 percent, $Al_2O_3$ 0.4 to 0.5 percent and a BET surface of 130 m2/g with an average particle size of 35 μ). In the case of active precipitated aluminum silicates, good results have been obtained with a BET surface of 130 m2/g and a primary particle diameter of 30 μ.

By mixing the microorganism suspension with the adsorption material and after careful removal of the moisture, preferably by adsorption drying without heating, a dry mass is obtained which prevents further reproduction in view of the absence of a liquid nutrient and can, thus, be stored without multiplying or at least having a reduced capability for multiplying. This dry mass can be stored without the maintaining of special temperatures and can be dosed out in precise weights whereby a uniform addition of the microoganisms is obtained.

With reference to the accompanying drawing and by way of further explanation of the method of the invention, an apparatus is depicted in the FIGURE thereof which illustrates the advantages of the carrying out of the novel process as well as the use of the apparatus.

In the apparatus, the two pressure covers 1 and 9 are pressed together with the aid of a manually operated pressure device 10. These pressure covers hold between them three fluid treating chambers 6, 6a, and 6b. These treating chambers are connected together in series and are separated from each other by porous plates 5, 5a, and 5b, which are reinforced by supporting elements 4, 4a, and 4b. the conduit 2 which has lateral (side) openings to each of the treating chambers 6, 6a, and 6b serves as a feed line for suspending the enzyme carrier, e.g., in water. By means of a pipe socket 8 or an enveloping pipe which is supported displaceably in the conduit 2 and which also has lateral openings, the inlet openings to the treating chambers can be closed or opened as desired. A second pipe conduit 3 which serves to feed the liquid to be treated into the first treating chamber 6 can be closed by a similar pipe socket 7. The collecting line 11 or conduit serves for the discharge of the completely treated liquid emerging from the last treating chamber 6b.

Upon the operating of the apparatus described, the inlet opening for the liquid to be treated in the conduit 3 is first of all closed by means of the pipe socket 7. Thereupon, through the pipe conduit 2 and the inlet openings of said conduit to the treating chamber 6, 6a, and 6b, an aqueous suspension of the enzyme carrier is pumped into the treating chambers, the liquid of the suspension being withdrawn through the porous plates 5, 5a, and 5b, and through the collecting conduit 11 and the enzyme carrier collected as a deposit in the treating chambers on the porous plates. Thereupon by means of the pipe socket 8, the inlet opening of the pipe conduit 2 to the treating chambers 6, 6a, and 6b are closed and the inlet opening of the pipe conduit 3 to the first treating chamber 6 is opened by actuation of the pipe socket 7. Then the liquid which is to be treated is pumped through the pipe conduit 3 through the in series connected treating chambers 6, 6a, and 6b, and this liquid emerges from the treating chamber 6b into the collecting conduit 11. In this connection, the liquid in each of the treatment chambers first flows through the deposit of the enzyme carrier on the porous plate and then through the porous plate itself. In the treating chambers 6, 6a, and 6b, moreover, heat exchange plates can be provided (not shown) which have openings through which the liquid flows. These plates can serve either for the cooling or heating of the liquid to be treated and can have a different temperature in each of the treatment chambers.

The features of the apparatus shown in the drawing can be modified in various manners. Thus, for instance, the pipe sockets 7 and 8 shown can be replaced by other shutoff members such as ordinary valves and the treating chambers 6, 6a, and 6b can be provided with separate feed lines for the enzyme carrier so that different enzyme carriers can be introduced into the individual treating chambers.

Thus, the above-described apparatus has at least one chamber with two inlet openings to be closed in succession by closure members, namely one for the enzyme carrier and one for the liquid to be treated, as well as an outlet opening formed by a porous body for the liquid and a collecting line connected with the outlet opening for the liquid emerging from the chamber.

According to the invention, the apparatus has two or more chambers connected in series, each having an inlet opening for the enzyme carrier and an inlet opening and an outlet opening for the liquid to be treated, the porous body which forms the outlet opening of the preceding chamber forming in each case the inlet opening for the following chamber, as well as a collecting line in communication with the outlet opening of the last chamber. If the porous bodies, in accordance with one suitable embodiment of the invention, are provided on the downstream side with supporting elements, such as elements 4, 4a, or 4b, the latter may consist for instance of perforated plates through which the liquid passes directly into the next chamber or these may be solid plates, in which case the liquid is then deflected from these plates into a channel arranged on the side of the chamber and from there into the next chamber.

In this connection, devices for changing the temperature of the liquid to be treated, for instance, for the heating or cooling thereof, can preferably be provided in some or all of the in series-connected chambers. Suitable heating devices can in this connection consist of heat exchange plates arranged parallel to the porous bodies and having openings through which the liquid to be treated passes.

The following example serves further to explain the method of the invention and the advantages obtained thereby.

EXAMPLE

In the laboratory test the above-described apparatus was used with only one chamber for the fermentation of beer wort by means of yeast. At the start of the experiment, washed and pressed brewery yeast was formed into a suspension as a viscous mass in water, and the same introduced into the treating chamber in an amount that a yeast cake of a thickness of 30 mm deposited on the porous plate having a surface of 20 + 20 mm. Thereupon, original beer wort of 13.2 percent total extract, measured by hydrometer (with due consideration of the temperature correction) was pumped through the treating chamber, the yeast cake, and the porous plate. At the start of the experiment, water still contained in the yeast cake was washed out by the beer wort so that the first runnings of the process were discarded. The temperature in the treatment chamber was maintained at 14°C. The contact time of the beer wort in the yeast cake was about 2 minutes.

The apparent degree of fermentation (fermentation-cellar fermentation degree) of the beer emerging from the treatment chamber was 4.2 percent extract, also measured with hydrometer (with due consideration of the temperature correction).

This experiment shows that it is possible by the present invention in a continuous process, with contact times of the beer wort with the yeast being of only about 2 minutes to obtain customary degrees of fermentation which heretofore were obtainable only with contact times of several hours.

What is claimed is:

1. An apparatus for accelerated fermentation of liquids comprising a series of chambers having an inlet conduit for introducing a microorganism and an inlet conduit for a liquid to be fermented, each of said chambers being provided with at least one communicating conduit with a next, adjacent chamber, closing means communicating with each chamber for alternatively closing of said inlet conduits, a porous member within each of said chambers upon which the microorganism is deposited, said porous member having pores of a diameter less than the diameter of particle sizes of said microorganism, hydraulic pressure means for forcing said liquid to be fermented through said porous member upon which the microorganism is deposited, a conduit for collecting the fermented liquid communicating with the last chamber, said porous member having a communicating conduit with each chamber wherein the porous member forms the outlet opening of the preceding chamber and the inlet opening for the adjacent chamber.

2. The apparatus according to claim 1, wherein the closing means communicating with each chamber is a slideable pipe conduit having wall perforation, said closing means being disposed in a circular channel conduit communicating with each chamber wherein the wall perforation of the slideable pipe conduit in the open position coincide with the inlet conduit for each of the chambers.

3. The apparatus according to claim 1 wherein the porous body is reinforced with support means.

4. The apparatus according to claims 1, wherein a heat exchange means is provided in each of the chambers for varying the temperature of the treated liquid.

5. The apparatus according to claims 1, wherein inlet means are provided for depositing a different microorganism on each of the porous members.

6. The apparatus according to claim 1 and wherein said porous member has pores of a diameter less than the diameter of a microorganism adsorbed on a carrier therefor.

* * * * *